Nov. 16, 1926.
A. HOLMAN
LOCK NUT
Filed April 3, 1925
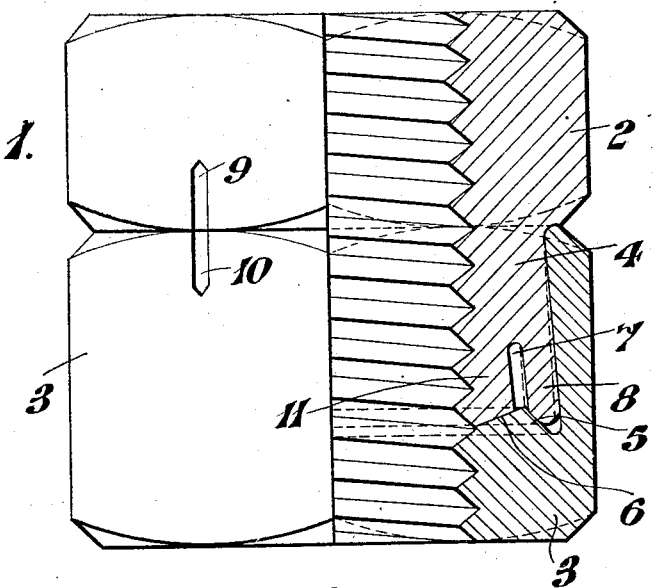
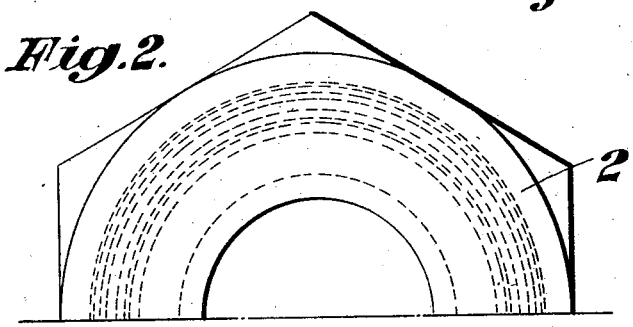
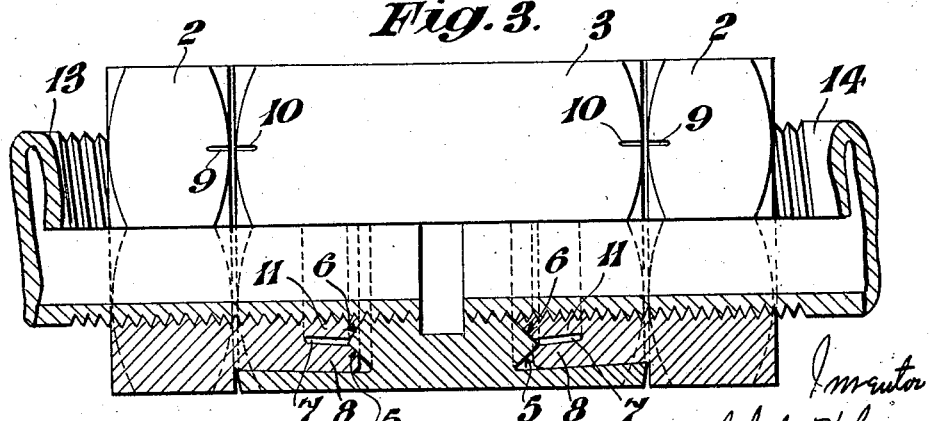

Patented Nov. 16, 1926.

1,606,941

UNITED STATES PATENT OFFICE.

ARCHIBALD HOLMAN, OF LONDON, ENGLAND.

LOCK NUT.

Application filed April 3, 1925, Serial No. 20,502, and in Great Britain April 7, 1924.

This invention relates to lock nuts consisting of two screwed portions connected together by a swivel-joint in such a manner that they can be locked together when on the screw for which they were designed by rotating them relatively to one another.

The object of the present invention is to increase the extent of grip between the locking surfaces of the nut, and this is effected by providing in the engaging faces between the end of the spigot and bottom of the socket portions of the nut an annular groove on the one adapted to engage an annular ridge provided on the other when one portion of the nut is rotated relatively to the other in the direction necessary to force them into contact when on a screw fitting the nut. A still further grip between the locking surfaces may be obtained by providing at the bottom of the groove in the grooved portion a narrower and preferably deeper groove, so that the widening of this narrow groove by the ridge will produce a large amount of friction between the locking surfaces, and to facilitate this action the cross section of the ridge may be triangular or wedge shaped.

A further feature of the invention comprises a lock-nut having two relatively rotatable but non-separable portions, one of which has a spigot portion extending into a socket on the other to form a swivel joint, wherein the spigot portion is at its lower end divided into two concentric annular portions of which the inner one is adapted—when the two portions are turned relatively to one another into locking contact—to be forced against the screw when in position thereon, while the outer one is forced against the sides of the socket in the other portion of the nut, both movements being effected by means of an annular wedge formed on the socket portion of the nut.

Two embodiments of the invention are illustrated by the accompanying drawings wherein Fig. 1 is a partly sectional elevation of a lock-nut made in accordance with the present invention, Fig. 2 a half plan of Fig. 1, and Fig. 3 a partly sectional view of the lock-nut applied to a pipe or hollow tie-rod joint.

In Figs. 1 and 2 of these drawings the invention is shown applied to a lock-nut of the kind having two relatively rotatable portions 2 and 3 of which the portion 2 has a cylindrical or slightly conical projection or spigot 4 fitting in a correspondingly shaped recess or socket formed in the portion 3 of the nut.

According to the present invention the engaging face at the bottom of the socket of the portion 3 has formed thereon a V-shaped or wedge shaped ridge 5 fitting against a correspondingly shaped groove 6 formed in the opposing face of the spigot portion 2 of the nut. In the example illustrated in Fig. 1 at the bottom of the groove 6 is formed a narrower and deeper groove 7 dividing the spigot portion of the nut into two concentric annular walls 8 and 11.

The inner inclined side of the ridge 5 may be inclined at an angle of 30° and the outer incline of the ridge at 45° to a plane at right angles to the axis of the nut, and the annular portion 8 made of somewhat smaller diameter than necessary to engage the sides of the recess in the portion 3 of the nut so as to allow the groove 7 to widen a little during the locking of the nut and so cause one wall 11 of the groove 7 to contract on to the screw and the other 8 to expand against the inner side of the socket portion 3 of the nut.

To facilitate the contraction of the inner wall 11 and the expansion of the outer wall 8 during locking action these walls may be provided with one or more radial slits.

In the construction of the nut the outer surface of the spigot 4 may be made cylindrical and rounded at its outer end over towards the V-shaped groove, while the bore is made of such a size that by means of a taper drift the spigot after insertion in the socket of the socket portion of the nut can be gradually expanded so as to fill the socket, the groove being formed at such a position in the spigot that such drifting operation will bring it into register with the apex of the ridge formed in the socket member and the surfaces of the ridge and groove into contact.

The outer end of the socket may be slightly chamfered or constructed with an inclined face or ridge of which the highest portion is nearer the inner than the outer surface of the socket. The two portions of the nut after being assembled together with their flat faces in register are marked with registering marks 9 and 10 and threaded in the usual manner.

In Fig. 3 is illustrated an example of the invention as applied to a lock-nut coupling for tubes or tie rods. The coupling illustrated consists of two oppositely disposed nuts as described above, the two adjacent members of the nuts being integral or rigidly connected together. The corresponding portions of the coupling are given the same reference numerals as in Fig. 1, the two inner members 6, 6, being connected together as an integral sleeve, and 13 and 14 are two pipes or tie rods connected by the coupling.

What I claim and desire to secure by Letters Patent is:—

1. A lock-nut having two relatively rotatable but non-separable portions one of which has a spigot portion extending into a socket on the other to form a swivel joint, wherein in the engaging faces between the end of the spigot and bottom of the socket is provided an annular groove on the one adapted to engage an annular ridge on the other when one portion of the nut is rotated relatively to the other in the direction necessary to force them into contact when on a screw fitting the nut.

2. A lock-nut having two relatively rotatable but non-separable portions, one of which has a spigot portion extending into a socket on the other to form a swivel joint, wherein the spigot portion is at its lower end divided into two concentric annular portions of which the inner one is adapted—when the two portions are turned relatively to one another into locking contact—to be forced against the screw when in position thereon, while the outer one is forced against the sides of the socket in the other portion of the nut, both movements being effected by means of an annular wedge formed on the socket portion of the nut.

3. A lock-nut in accordance with claim 1, wherein at the bottom of the groove in the grooved portion is provided a narrower groove.

4. A lock-nut having two relatively rotatable but non-separable portions one of which has a spigot portion extending into a socket on the other to form a swivel joint, wherein in the engaging faces between the end of the spigot and bottom of the socket is provided an annular groove on the one having a wedge-shaped opening and adapted to engage an annular wedge-shaped ridge on the other when one portion of the nut is rotated relatively to the other in the direction necessary to force them into contact when on a screw fitting the nut.

5. A lock-nut having two relatively rotatable but non-separable portions one of which has a spigot portion extending into a socket on the other to form a swivel joint, wherein in the engaging faces between the end of the spigot and bottom of the socket is provided an annular groove on the one having a wedge-shaped opening and adapted to engage an annular wedge-shaped ridge on the other when one portion of the nut is rotated relatively to the other in the direction necessary to force them into contact when on a screw fitting the nut, the annular wedge-shaped rim having its inner side inclined at 30° and its outer side at 45° to a plane at right angles to the axis of the nut.

In witness whereof I affix my signature.

ARCHIBALD HOLMAN.